2,881,170
Patented Apr. 7, 1959

2,881,170
TROPAMINONE COMPOUNDS AND A PROCESS OF MAKING SAME

Paul Bellet, Paris, France, assignor to UCLAF, Paris, France, a corporation of France No Drawing. Application November 2, 1954
Serial No. 466,437

Claims priority, application France November 12, 1953

10 Claims. (Cl. 260—247.2)

The present invention relates to new tropaminone compounds and more particularly to tropaminone compounds of the desmethyl colchiceine amide group and its N-substituted derivatives, and to a process of making same.

The present invention has for its object to provide new and valuable tropaminone compounds, namely desmethyl colchiceine amide which is the aglucone of colchicosamide, and its N-substituted derivatives.

Another object of this invention is to provide a simple and effective method of producing such desmethyl colchiceine amide and its N-substitution products.

A further object of the present invention is to provide new preparations containing said new desmethyl colchiceine amide and its N-substitution products as such or diluted with solvents or other diluting agents, said preparations representing valuable and useful agents for causing polyploidisms and being employed in agriculture, and especially for the treatment of soils in which plants to be subjected to their action are cultivated or for the treatment of seeds.

Other objects of the present invention and advantageous features thereof will become apparent as the description proceeds.

The new compound desmethyl colchiceine amide corresponds to the general formula $C_{20}H_{22}O_5N_2$ and is obtained by replacing the methoxy group in 2-desmethyl colchicine, which is also known as substance C of the active colchicum principles, by an amino group. Formula 1 as given hereinafter represents said colchicum compound C while Formula 2 shows the structure of 2-desmethyl colchiceine amide according to the present invention. Said compounds are designated according to the proposals made by Santavy and Talas in "Chem. Listy," 1952, vol. 46, page 373, for desmethyl colchicine. The N-substituted derivatives of said new 2-desmethyl colchiceine amide are illustrated by the following Formula 3

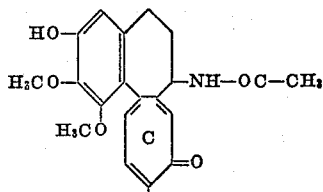

FORMULA 1
2-desmethyl colchicine

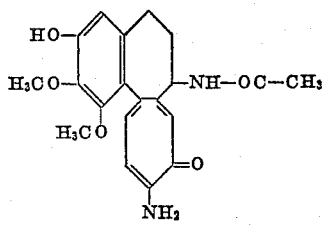

FORMULA 2
2-desmethyl colchiceine amide

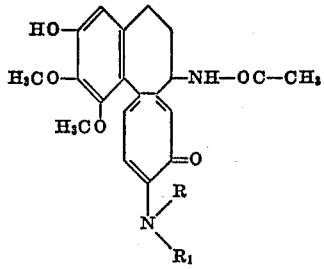

FORMULA 3

N-substitution products of 2-desmethyl colchiceine amide

In said Formula 3, R and $R_1$ represent hydrogen, an alkyl radical, or a hydroxy alkyl radical. $R_1$ and $R_2$ together with the nitrogen atom to which they are attached may also form a heterocyclic ring.

Desmethyl colchiceine amide and its N-substituted derivatives may be designated by the generic name tropaminones. Said designation shall also be used herein and in the claims hereof.

The tropaminones according to the present invention are products which crystallize from alcohol in yellow prisms. Said crystals often retain varying proportions of solvent which they lose only on heating above about 100° C. in a vacuum. They are generally insoluble in water and dilute acids. They readily dissolve, however, in dilute bases. Certain members of this series are also soluble in absolute alcohol. They are often very little soluble or even insoluble in most of the other organic solvents.

The process of preparing said compounds according to the present invention consists in reacting an amino compound of the formula

in which R and $R_1$ represent the same substituents as mentioned above, with a solution of desmethyl colchicine (compound C) in a suitable solvent.

In order to produce desmethyl colchiceine amide, ammonia is used as amino compound. N-substituted derivatives of said desmethyl colchiceine amide are obtained by employing as amino compound a primary or secondary aliphatic amine which may be substituted by a hydroxyl group, or a heterocyclic compound having an —NH-group in its heterocyclic nucleus, as morpholine and piperidine.

Water or an organic solvent such as an alcohol may be used as solvent for this reaction. Said organic solvent may be employed as such or in mixture with water. It is also possible to employ an excess of the amino compound which serves as the one reaction component, as such solvent. It is the preferred procedure to first dissolve the amino compound used as reactant in the above mentioned solvent and then contact the resulting solution with desmethyl colchicine.

The reaction of desmethyl colchicine and said amino compound is preferably carried out at room temperature. The reactants are kept in contact with each other until no further reaction takes place. This requires more or less time according to the specific reactants employed. In some cases the amino compound used in this reaction does not properly react at room temperature. In such instances, the reaction temperature is preferably increased, and it is often necessary to operate under pressure due to the relatively high volatility of the aliphatic amino compounds. The highest temperature to be employed is, of course, readily determined by that temperature which causes changes and decomposition in the reactants and the reaction products.

After the reaction is complete, any excess of amino compound is removed by distillation in a vacuum if said amino compound is volatile. In case the amino compound has only a low volatility, its excess thereof is removed by the use of a suitable solvent which does not dissolve the resulting tropaminone. The tropaminone compound representing the reaction product is then purified by recrystallization.

The following examples serve to illustrate the present invention without, however, limiting the same thereto.

The analytical data and the rotatory power given in said examples were determined by analyzing and testing reaction products freed from solvents by drying in a vacuum. The melting points were determined by heating the compounds in a capillary tube. The absolute error in determining the rotatory power amounts to about ±3.0.

EXAMPLE 1

*2-desmethyl colchiceine amide (Formula 2)*

2000 cc. of a 16.3 N aqueous ammonia solution are added to a solution of 20 g. of crystalline 2-desmethyl colchicine corresponding to 17.25 g. of solvent-free product, in 60 cc. of water. The mixture is allowed to stand at 20° C. for 20 hours and is then evaporated in a vacuum at 45° C. After excess ammonia has been driven off, the reaction product is obtained in triangular prisms of sulfur-yellow color. The mixture is cooled with ice, the crystals are filtered off, washed with ice water, and dried in the cold over phosphorus pentoxide. 11.73 g. of 2-desmethyl colchiceine amide are obtained, corresponding to a yield of 70% of the theoretical yield. Said compound melts at 275° C. It is only slightly soluble in water, insoluble in chloroform, ether, and benzene, and very little soluble in acetone. It is, however, very soluble in methanol and ethanol, soluble in dilute hydrochloric acid and in dilute sodium hydroxide solution.

*Analysis.*—Calculated for $C_{20}H_{22}O_5N_2$: 7.56% N. Found: 7.5% N.

The mother liquors obtained on filtering off said compound are acidified to a pH of 3.5 by means of 50% acetic acid. Said acidified mother liquors are extracted four times with 200 cc. of chloroform. The combined chloroform extracts are washed with water and dried over sodium sulfate. On distilling off the chloroform, a residue is obtained which, in the dry state, weighs 5.58 g., corresponding to 33.5% of the starting material. Said dry residue, which is obtained in the form of a resin, is dissolved in 3 cc. of warm chloroform and the resulting solution is added to 10 cc. of lukewarm acetone. On cooling, crystals are formed. The mixture is cooled with ice, the crystals are filtered off, and washed with a small amount of cold acetone. The resulting crystals of desmethyl colchicine have a weight of 4 g. They do not give a melting point depression with the starting material.

EXAMPLE 2

*N-monomethyl-2-desmethyl colchiceine amide (Formula 3; R=H; $R_1$=CH$_3$)*

1.150 g. of crystalline 2-desmethyl colchicine, corresponding to 1 g. of solvent-free product, are introduced in a glass tube and mixed therein with 1.5 cc. of a 3.5 N solution of methylamine in absolute alcohol. After solution has taken place, the tube is sealed and the mixture is allowed to stand at 5° C. for 48 hours. An abundant amount of crystals in the form of yellow prisms are produced thereby which crystals adhere to the walls of the tube. Said crystals are filtered off, washed with cold ethanol, and dried in a vacuum. 0.998 g. of the reaction product are obtained corresponding to a yield of about 100%. Said compound has a melting point of 271–282° C. and a rotatory power $[\alpha]_D^{20}$=−70° (c.= 1% in chloroform). The compound is insoluble in water, ethanol, ether, benzene, and dilute aqueous acids. It is very soluble in chloroform and soluble in N sodium hydroxide solution.

Said compound is recrystallized by dissolving it in a minimum amount of chloroform and diluting the solution with 10 times its volume of absolute ethanol. The solution is then concentrated by evaporation in a vacuum to half its volume in order to eliminate the chloroform, and the concentrate is cooled by means of ice. The precipitated crystals are filtered off, washed with ethanol, and dried in a vacuum. 0.628 g. of small prisms melting at 272/278–281° C. The compound does not contain any solvent.

*Analysis.*—Calculated for $C_{21}H_{24}O_5N_2$: 65.60% C; 6.28% H; 7.28% N. Found: 65.4% C; 6.2% H; 7.1% N.

EXAMPLE 3

*N-dimethyl-2-desmethyl colchiceine amide (Formula 3; R and $R_1$=CH$_3$)*

2 g. of 2-desmethyl colchicine containing chloroform as solvent of crystallization (corresponding to 1.36 g. of solvent-free compound) are dissolved in 4 cc. of absolute ethanol. 12 cc. of a 4 N alcoholic solution of dimethylamine are added thereto. The mixture attains first a deep red color and turns yellowish within one hour. Thereafter the mixture is allowed to stand for 5 hours at 15–20° C. and is evaporated to dryness. The residue is dissolved in acetone. 0.974 g. of dimethyl tropaminone are obtained corresponding to a yield of 70% of the theoretical yield. To purify said compound, it is dissolved in 40 cc. of chloroform. The solution is evaporated to dryness and the residue is triturated with acetone. The tropaminone compound crystallizes in very small prisms or rectangular lamellae. 0.812 g. are obtained thereby. Its melting point 268° C. Its rotatory power $[\alpha]_D^{20}$=+486° (c.=1% in chloroform) or $$[\alpha]_D^{20}=-230°$$

(c.=1% in N sodium hydroxide solution).

It is only slightly soluble in chloroform, insoluble in water, alcohol, acetone, ether, and benzene, and soluble in N sodium hydroxide solution.

*Analysis.*—Calculated for $C_{22}H_{26}O_5N_2$: 66.27% C; 6.58% H; 7.03% N. Found: 66.0% C; 6.5% H; 6.9% N.

EXAMPLE 4

*N-monoethyl-2-desmethyl colchiceine amide (Formula 3; R=H, $R_1$=C$_2$H$_5$)*

1.5 g. of 2-desmethyl colchicine containing chloroform as solvent of crystallization (corresponding to 1.02 g. of solvent-free compound) are dissolved in 5 cc. of absolute ethanol. 1.5 cc. of ethylamine are added thereto. The solution is heated in a sealed glass tube on the water bath at 50–55° C. for 1½ hours. After cooling, rapid crystallization sets in. The product precipitates in the form of yellow, clear rectangular prisms. They are filtered off and washed with alcohol and with ether. After drying in a vacuum, 0.763 g. of the corresponding tropaminone are obtained corresponding to a yield of 75% of the theoretical yield. The melting point of said compound is 265–270° C. Its rotatory power $$[\alpha]_D^{20}=-723°\pm5$$

(c.=1% in N sodium hydroxide solution). The compound is insoluble in water, dilute acids, and benzene and very little soluble in chloroform, ethanol, methanol, ether, and acetone. It is very soluble in dilute aqueous alkali hydroxide solutions.

*Analysis.*—Calculated for $C_{22}H_{26}O_5N_2$: 66.27% C; 6.58% H; 7.03% N. Found: 66.5% C; 6.6% H; 7.2% N.

EXAMPLE 5

*N-diethyl-2-desmethyl colchiceine amide (Formula 3; R and $R_1$=$C_2H_5$)*

3 g. of 2-desmethyl colchicine containing chloroform as solvent of crystallization (corresponding to 2.04 g. of solvent-free compound) are dissolved in 18 cc. of absolute ethanol. 4.5 cc. of diethylamine are added thereto. The solution attains a red-orange color. The mixture is allowed to stand at 15–20° C. for 36 hours. Thereafter the solution has attained a brown-red color. It is evaporated in a vacuum. The residue is dissolved in 9 cc. of ethanol. The solution is evaporated to dryness and the residue is triturated with 15 cc. of acetone. The resulting tropaminone crystallizes immediately in dark yellow rectangular crystals.

The first fraction weighs 0.708 g. corresponding to a yield of 31%. Its melting point is 195–198° C.

The second fraction weighs 0.414 g. corresponding to a yield of 18%. Its melting point is 190–192° C.

The third fraction weighs 0.393 g. corresponding to a yield of 17%. Its melting point is 185–192° C.

For purification purposes said fractions are recrystallized from a mixture of alcohol and ether (1:1). The resulting recrystallized compound melts at 197–200° C. Its rotatory power is $[\alpha]_D^{20}$=+116° (c.: 0.9% in N sodium hydroxide solution)
$[\alpha]_D^{20}$=+67° (c.: 0.9% in methanol)
$[\alpha]_D^{20}$=+595° (c.: 0.9% in chloroform)

The new tropaminone compound is insoluble in acetone, benzene and ether. It is very little soluble in water and dilute aqueous acids solutions, soluble in ethanol, chloroform and dilute aqueous alkali solutions.

To carry out an analysis of said compound, it is dried in a vacuum at 150° C.

*Analysis.*—Calculated for $C_{24}H_{30}O_5N_2$: 67.58% C; 7.08% H; 6.57% N. Found: 67.5% C; 7.1% H; 6.7% N.

EXAMPLE 6

*N-β-hydroxy ethyl-2-desmethyl colchiceine amide (Formula 3; R=H; $R_1$=$C_2H_4OH$)*

1.2 g. of 2-desmethyl colchicine containing chloroform as solvent of crystallization (corresponding to 0.82 g. of solvent-free compound) are dissolved in 8 cc. of a 5 N solution of mono-ethanolamine in absolute alcohol. The mixture is heated in a sealed tube at 100° C. for 6 hours. The resulting solution is of yellow-orange color. The alcohol is evaporated and the residue is triturated three times with 5 cc. of ether whereafter each time the ether is decanted. The remaining brown residue is dissolved in 5 cc. of lukewarm ethanol. On cooling the solution, crystallization sets in very rapidly and hexagonal prismatic lamellae are obtained. The crystals are filtered off, washed with alcohol, and dried. 0.753 g. of the corresponding ethanolamide compound are obtained, corresponding to a yield of 86%. Said compound melts at 175–207° C. It is dissolved in 10 cc. of a warm mixture of chloroform and alcohol (1:1), chloroform is distilled off from said solution, and the remaining alcoholic solution is cooled, whereby crystallization sets in rapidly. After filtration, the crystals are washed with cold alcohol and are dried in a vacuum at room temperature. The resulting product melts between 180° C. and 257° C.

The new tropaminone compound is insoluble in water, ether, benzene, and chloroform. It is very little soluble in absolute ethanol and acetone, and soluble in a mixture of chloroform and ethanol (1:1); dilute aqueous acids, and dilute aqueous alkali hydroxide solutions.

To carry out an analysis of said compound, it is dried in a vacuum at 150° C. whereby it loses about 10% of its weight. Its rotary power is as follows:

$[\alpha]_D^{20}$=−187° (c.=1% in methanol)
$[\alpha]_D^{20}$=−740° (c.=1% in N sodium hydroxide solution).

*Analysis.*—Calculated for $C_{22}H_{26}O_6N_2$: 63.7% C; 6.33% H; 6.77% N. Found: 63.5% C; 6.3% H; 6.9% N.

EXAMPLE 7

*N-(n-propyl)-2-desmethyl colchiceine amide (Formula 3; R=H, $R_1$=$CH_2$—$CH_2$—$CH_3$)*

4 g. of 2-desmethyl colchicine containing chloroform as solvent of crystallization (corresponding to 2.720 g. of solvent-free compound) are dissolved in 16 cc. of absolute ethanol. 3.2 cc. of propylamine are added thereto. The red solution is allowed to stand at 15–20° C. for 72 hours.

The alcohol is evaporated and the residue is dissolved in 20 cc. of boiling acetone. The solution is cooled to about 35° C. and diluted with about 2 times its volume of ether. Crystallization of the amide sets in rapidly and the yellow clusters of rectangular lamellae are filtered off by suction, washed with ether, and dried.

2.260 g. of a first fraction melting at 255–257° C. are obtained thereby. The yield is 77%. By concentrating the mother liquor a second fraction is recovered in the amount of 0.296 g. melting at 254–256° C. and corresponding to a yield of 10%. Thus, the total yield is about 87%.

For purification, the resulting product is dissolved in a minimum amount of warm acetone. The solution is cooled to 35° C. and diluted with ether as described hereinbefore. The crystalline product separated therefrom melts at 255° C. It loses 4.2% of its weight on drying in a vacuum at 120° C. Its rotatory power is:

$[\alpha]_D^{20}$=−237° (c.=1% in methanol)
$[\alpha]_D^{20}$=−667° (c.=1% in N sodium hydroxide solution).

The product is insoluble in water, dilute aqueous acids, ether, benzene, and chloroform, soluble in 30 times its volume of N sodium hydroxide solution, alcohol, and warm acetone.

*Analysis.*—Calculated for $C_{23}H_{28}O_6N_2$: 66.9% C; 6.83% H; 6.8% N. Found: 66.8% C; 6.9% H; 7.0% N.

EXAMPLE 8

*N-(n-butyl)-2-desmethyl colchiceine amide (Formula 3; R=H; $R_1$=$CH_2$—$CH_2$—$CH_2$—$CH_3$)*

5 g. of 2-desmethyl colchicine containing 32% chloroform as solvent of crystallization (corresponding to 3.4 g. of solvent-free compound) are dissolved in 17.5 cc. of absolute ethanol. 7.5 cc. of n-butylamine are added thereto. The solution attains a red color which changes, within about 1 hour, to a yellow color. The mixture is allowed to stand at 15° C. for 6 days.

Ethanol is added to the mixture and excess amine is removed by distilling said mixture in a vacuum whereby the ethanol carries along the amine. This addition of ethanol and distillation is repeated until excess amine is completely removed. The mixture is then evaporated to dryness in a vacuum. The residue is dissolved in 25 cc. of boiling acetone. On cooling, the corresponding tropaminone compound immediately crystallizes in the form of yellow rectangular prisms. The crystals are filtered off and are dried whereby 3.4 g. of a crude product are recovered corresponding to a yield of 90%. The product is redissolved in ethanol, the solution is subjected to distillation, and is evaporated to dryness. The residue is recrystallized from acetone. A first fraction of 2.54 g. melting at 155–160° C. is obtained thereby. Its rotatory power is:

$[\alpha]_D^{20} = -256°$ (c.=0.9% in methanol)
$[\alpha]_D^{20} = -66°$ (c.=0.9% in chloroform)
$[\alpha]_D^{20} = -512°$ (c.=0.9% in N sodium hydroxide solution).

On drying in a vacuum at 100° C. the product loses 9.4% of its weight. It is readily soluble in aqueous alkali hydroxide solutions and alcohol, soluble in chloroform, very little soluble in acetone, and insoluble in dilute aqueous acids, ether, and benzene.

*Analysis.*—Calculated for $C_{24}H_{30}O_5N_2$: 67.58% C; 7.08% H; 6.56% N. Found: 67.6% C; 7.1% H; 6.6% N.

EXAMPLE 9

*N-(n-amyl)-2-desmethyl colchiceine amide (Formula 3; R=H; $R_1$=$CH_2$—$CH_2$—$CH_2$—$CH_2$—$CH_3$)*

3 g. of 2-desmethyl colchicine which were recrystallized from chloroform (corresponding to 2.04 g. of solvent-free compound) are dissolved in 10 cc. of absolute ethanol. 4.5 cc. of n-amylamine are added thereto and the reaction mixture is allowed to stand at room temperature for 4 days. The solution, which initially is of brightly red color, becomes yellowish within one hour. The reaction mixture is evaporated in a vacuum at a low temperature whereby finally the corresponding tropaminone compound crystallizes. 0.825 g. of a first fraction melting at 152–153° C. are obtained thereby corresponding to a yield of 35%. The mother liquors are evaporated to dryness and the evaporation residue is extracted with warm ether. The residue which is insoluble in ether is recrystallized from acetone. The acetone solution is cooled with ice and yields, after filtering and drying, a second fraction in the amount of 0.774 g. which melts at 152–155° C.

The two fractions are combined and recrystallized from acetone. 1.212 g. melting at 155–156° are obtained thereby. Its rotatory power is $[\alpha]_D^{20} = -395°$ (c.=1% in N sodium hydroxide solution)
$[\alpha]_D^{20} = -226°$ (c.=1% in methanol).

The yellow product which is obtained in the forms of prisms and rectangular lamellae is insoluble in water, dilute aqueous acids, ether, benzene, and chloroform. It is soluble in N sodium hydroxide solution, acetone, and alcohol. On drying in a vacuum at 120° C., it loses 3.4% of its weight.

*Analysis.*—Calculated for $C_{25}H_{32}O_5N_2$: 68.2% C; 7.32% H; 6.35% N. Found: 68.1% C; 7.5% H; 6.5% N.

EXAMPLE 10

*N-(n-hexyl)-2-desmethyl colchiceine amide (Formula 3; R=H; $R_1$=$CH_2$—$CH_2$—$CH_2$—$CH_2$—$CH_2$—$CH_3$)*

The procedure is the same as described in the preceding Example 9, whereby 3 g. of 2-desmethyl colchicine and 4.5 cc. of n-hexylamine are reacted with each other. The reaction mixture is allowed to stand at room temperature for 6 days. The solution is first of brightly red color and changes its color to yellow within one hour. The reaction mixture is evaporated in a vacuum at elevated temperature whereby excess n-hexylamine is driven off by three successive additions of 15 cc. of absolute ethanol each time at the end of the distillation. The residue is dissolved in 12 cc. of acetone and 24 cc. of ether are added thereto. The mixture is allowed to stand for 4 hours in ice. Crystallization is initiated by rubbing the wall of the reaction flask with a glass rod. A first fraction of yellow cubic crystals in the amount of 1.8 g. is obtained thereby. Said fraction melts at 142–145° C. The yield is 75%. The mother liquors are evaporated to dryness, the residue is taken up in a minimum amount of acetone and twice its volume of ether is added thereto. Again crystallization is initiated by rubbing as described above whereby a second fraction of 0.273 g. melting at 159° C. is obtained. The two fractions are combined and are recrystallized from a mixture of acetone and ether (1:3). 1.665 g. of a compound melting at 168° C. are obtained thereby. Its rotatory power is $[\alpha]_D^{20} = -223°$ (c.=1% in methanol)
$[\alpha]_D^{20} = -104°$ (c.=1% in chloroform)
$[\alpha]_D^{20} = -342°$ (c.=1% in N sodium hydroxide solution).

Said new tropaminone compound is insoluble in water, dilute aqueous acids, ether, and benzene. It is soluble in ethanol, chloroform, acetone, and dilute aqueous alkali hydroxide solutions.

*Analysis.*—Calculated for $C_{26}H_{34}O_5N_2$: 68.70% C; 7.54% H; 6.16% N. Found: 68.6% C; 7.5% H; 6.1% N.

EXAMPLE 11

*2-desmethyl colchiceine morpholide (Formula 3; R+$R_1$= —$CH_2$—$CH_2$—O—$CH_2$—$CH_2$—)*

4 g. of 2-desmethyl colchicine which was recrystallized from chloroform (corresponding to 2.720 g. of solvent-free compound) are dissolved in 14 cc. of absolute ethanol. 6 cc. of morpholine are added thereto. The solution attains a yellow-orange color. The reaction mixture is allowed to stand for 100 hours at 15–20° C.

The mixture is distilled in a vacuum to dryness and the residue is several times triturated with ether which is decanted each time. The resulting light-colored resin is dissolved in acetone wherefrom it crystallizes rapidly in the form of hexagonal prisms. The solution is cooled with ice. The crystals are filtered off, washed on the filter with ice-cold acetone, and dried. A first fraction of 2.3 g. melting at 182–185° C. are obtained thereby, corresponding to a yield of 74%. On evaporation of the mother liquors to dryness and recrystallization from acetone there is obtained a second fraction of 0.8 g. melting at 180–182° C. The yield is 25%.

The two fractions are combined and yield, on recrystallization from acetone, 1.8 g. of the corresponding tropaminone compound, melting at 182–185° C. On drying in a vacuum at 100° C., said product loses 4.3% of its weight. Its rotatory power is $[\alpha]_D^{20} = -248°$ (c.=1% in methanol)
$[\alpha]_D^{20} = -628°$ (c.=1% in N sodium hydroxide solution).

The product is insoluble in ether and benzene, slightly soluble in acetone and chloroform, soluble in water, dilute aqueous acids, dilute aqueous alkali hydroxide solution, ethanol, and methanol.

*Analysis.*—Calculated for $C_{24}H_{28}O_6N_2$: 65.44% C; 6.41% H; 6.36% N. Found: 65.3% C; 6.4% H; 6.2% N.

EXAMPLE 12

*N,N-cyclopentamethylene-2-desmethyl colchiceine amide (Formula 3; R+$R_1$=—$CH_2$—$CH_2$—$CH_2$—$CH_2$—$CH_2$—)*

The procedure is about the same as described in the preceding Example 11, whereby 4 g. of 2-desmethyl colchicine, 6 cc. of piperidine, and 14 cc. of absolute ethanol are reacted. After allowing the reaction mixture to stand for 2 hours, crystals precipitate from the red liquid. The reaction is allowed to proceed until the next day whereafter the precipitated crystals are filtered off. 1 g. thereof melting at 170–180° C. is obtained corresponding to a yield of 32%. The mother liquors are evaporated to dryness in a vacuum and the residue is dissolved in acetone from which solution it crystallizes rapidly. The crystals are filtered off and a second fraction of 1.620 g. is obtained. Said product melts at 254–255° C. The yield amounts to 52%

The first fraction is recrystallized from acetone and yields 0.56 g. of a product melting at 178–268° C. Said first fraction, thus, represents non-reacted 2-desmethyl colchicine.

The second fraction, after recrystallization from acetone, yields 1.2 g. of the corresponding tropaminone compound melting at 255° C. Its rotatory power is $[\alpha]_D^{20} = -195°$ (c.=1% in methanol)
$[\alpha]_D^{20} = -505°$ (c.=1% in N sodium hydroxide solution).

Said tropaminone compound is obtained in the form of dark yellow, rectangular prisms. It is insoluble in water, dilute aqueous acids, ether, and benzene, slightly soluble in acetone and chloroform, and soluble in alcohol and aqueous sodium hydroxide solution. On drying in a vacuum at 100° C., it loses 2.1% of its weight.

*Analysis.*—Calculated for $C_{25}H_{30}O_5N_2$: 68.48% C; 6.90% H; 6.38% N. Found: 68.4% C; 6.9% H; 6.5% N.

There can be used equimolecular amounts of other amino compounds in place of the amino compounds employed as the one reaction component in the preceding examples. In place of methylamine, dimethylamine, and other lower alkylamines the reaction may be carried out with other primary amines, such as isopropylamine, isobutylamine, tertiary butylamine, the various isomeric amylamines, or with other secondary aliphatic amines, such as dipropylamine, dibutylamine, methyl ethylamine, and others. Ethanolamine may be replaced by equimolecular amounts of other alkanolamines, such as propanolamines, butanolamines, pentanolamines, and also by di-ethanolamines, di-propanolamines, di-butanolamines, and others. Unsaturated alkylamines may also be employed, such as allylamine, and the like. In place of morpholine and piperidine there may be used other heterocyclic compounds having an —NH-group in their heterocyclic nucleus, such as pyrrolidine, methyl piperidines, and others.

Many other changes and variations in the reaction conditions, the temperature and duration, the solvents used, the methods employed for working up the new tropaminone compounds and for purifying the same, and the like, may be made by those skilled in the art in accordance with the principles set forth herein and in the claims annexed hereto.

The new compounds are advantageously used in agriculture. The following example illustrates a preparation employed for this purpose.

EXAMPLE 13

A 1% solution of a tropaminone compound as it is obtained according to the preceding Examples 1 to 12, in N sodium hydroxide solution is prepared and employed in agriculture as a concentrate for the preparation of solutions of desired concentration to be used in the treatment of seeds to produce polyploidism. Such a solution may also be applied to the soil on which plants to be treated are cultivated.

I claim:
1. The 2-desmethyl colchiceine amide.
2. The N-mono-methyl-2-desmethyl colchiceine amide.
3. The N-di-methyl-2-desmethyl colchiceine amide.
4. The N-β-hydroxy ethyl-2-desmethyl colchiceine amide.
5. The 2-desmethyl colchiceine-N-piperidide.
6. The N-mono-lower alkyl-2-desmethyl colchiceine amide.
7. The N-di-lower alkyl-2-desmethyl colchiceine amide.
8. The N-β-hydroxy lower alkyl-2-desmethyl colchiceine amide.
9. The tropaminone compound of the formula

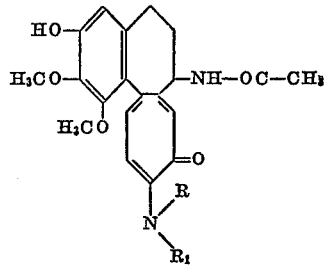

wherein R and $R_1$ are members selected from the group consisting of hydrogen, a lower alkyl radical, a hydroxy lower alkyl radical, and $R_1$ and $R_2$ together with the nitrogen atom to which they are attached forming a heterocyclic ring selected from the group consisting of the morpholine, piperidine, pyrrolidine, and methyl piperidine ring.

10. The 2-desmethyl colchiceine-N-morpholide.

References Cited in the file of this patent

Hartwell et al.: Journal of the American Chemical Society, vol. 74, pp. 3180–81, June 20, 1952.
Leiter et al.: Journal of the National Cancer Institute, vol. 13, pp. 731–39 (1952).
Lettré et al.: Zeitschrift für physiologische Chemie (Hoppe-Seyler's), vol. 286, pp. 138–144.